Sept. 8, 1953   R. P. HAWKINSON   2,651,078
MOLD FOR RETREADING PNEUMATIC TIRE CASINGS
Filed Oct. 20, 1952
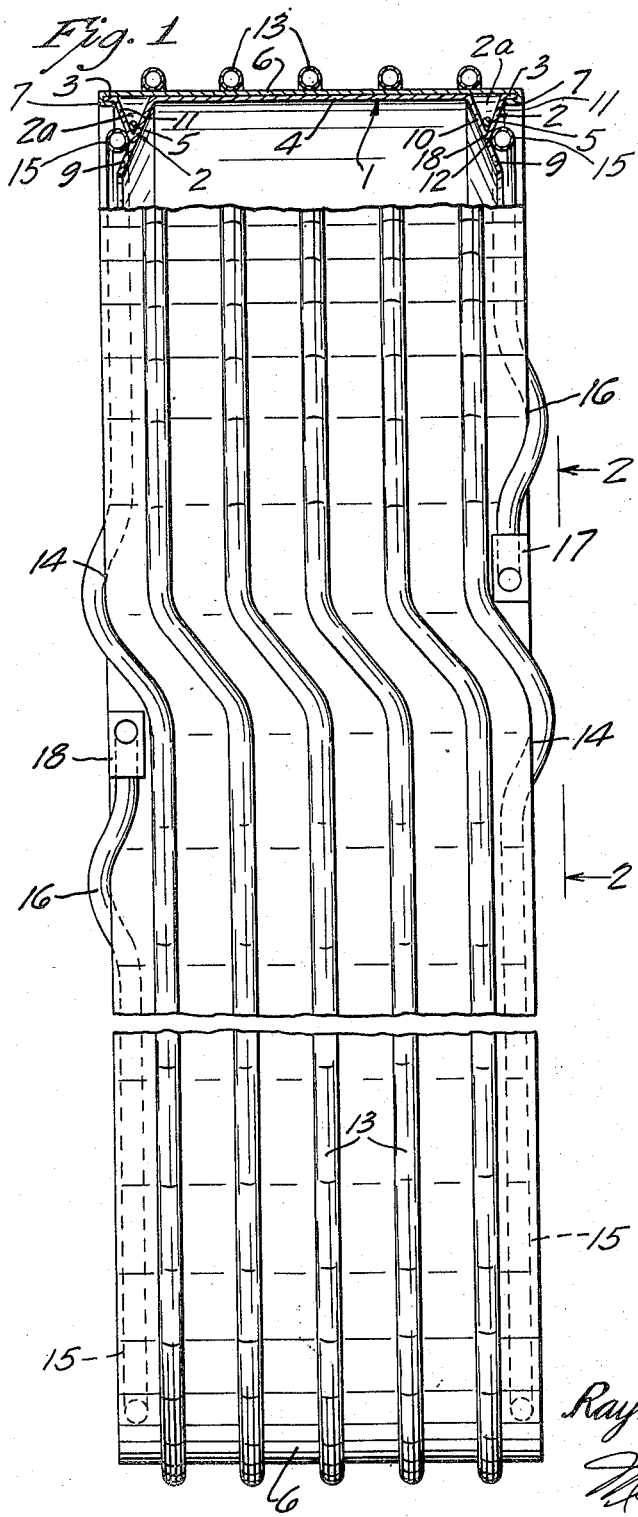
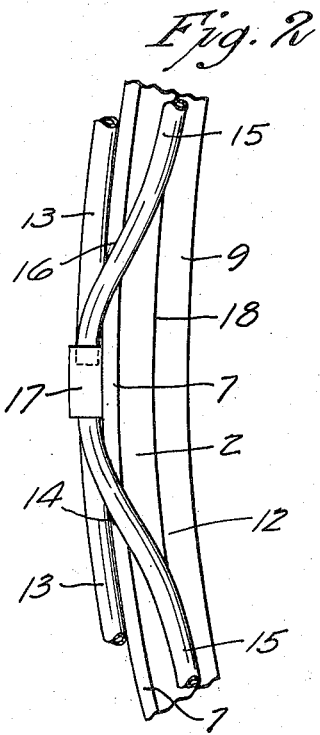
INVENTOR.
Raymond P. Hawkinson
BY
Merchant & Merchant
ATTORNEYS Patented Sept. 8, 1953

2,651,078

UNITED STATES PATENT OFFICE 2,651,078

MOLD FOR RETREADING PNEUMATIC TIRE CASINGS

Raymond P. Hawkinson, Minneapolis, Minn., assignor to Paul E. Hawkinson Company, Minneapolis, Minn., a corporation of Minnesota Application October 20, 1952, Serial No. 315,617

3 Claims. (Cl. 18—18)

My invention relates to equipment for retreading pneumatic tire casings, and more specifically to improvements in endless cylinder-like sheet metal matrices of the type disclosed in U. S. Patents 1,917,262 and 2,339,696.

Molds of the above type are provided with radially inwardly projecting continuous V-shaped tread material confining flanges adjacent their opposite side edges. Recently there has been a tendency in some cases to extend, or radially deepen, these flanges so as to overlap somewhat the thick shoulders on opposite sides of the worn tread of a pneumatic tire. I have observed that as these flanges are deepened or extended that insufficient heat has been imparted thereto for proper vulcanization.

The primary object of my invention is the provision of novel means for imparting heat to the radially innermost portions of the extended flanges, in molds or matrices of the above type.

A still further object of my invention is the provision of novel heating means for sheet metal molds of the above character.

The above and still further objects of my invention will become apparent from the following detailed specification, appended claims and attached drawings.

Referring to the drawings wherein like characters indicate like parts throughout the several views:

Fig. 1 is a plan view of my novel matrix, some parts being broken away and some parts being shown in transverse section and Fig. 2 is an enlarged fragmentary detail taken on the line 2—2 of Fig. 1.

Referring with greater particularity to the drawings, the numeral 1 indicates a cylinder-like matrix formed from sheet metal and having integrally-formed continuous radially inwardly projecting tread material confining flanges 2 adjacent its opposite side edge portions 3. As shown, the side edges 3 are in the nature of cylinder-like lips lying in the same plane as the cylindrical portion 4 intermediate the confining flanges 2.

Endless wires 5 are preferably inserted in the bottoms of the cavities 2a provided by the confining flanges 2 for the purpose of reinforcement. Thereafter, an endless reinforcing jacket 6 is wrapped tightly about the peripheral surface of the matrix 1 with its opposite side edge portions 7 overlapping the side edge portions 3 of the matrix 1 and being crimped thereabout to positively limit lateral spreading action of the matrix 1. U. S. Patent 2,331,679 discloses the preferred method of applying the reinforcing jacket 6.

Reinforcing flanges 2 are effectively lengthened or deepened by welding to the radially innermost relatively pointed edges 8 thereof, rectangular metallic rings 9. Preferably and as shown, the rings 9 lie in the same plane as and effectively form generally radially inward extensions of the tapering inner walls 10 of the V-shaped confining flanges 2. Consequently, the rings 9 and the outer walls 11 converge to form an annular recess 12.

For the purpose of imparting vulcanizing heat to the matrix above described, I wind generally spirally about the reinforcing jacket 6—and rigidly secure same thereto as by solder—an endless tubular steam conduit 13. The opposite end portions of the conduit 13, extend over the opposite edges 7 of the jacket 6 at given points 14, and from thence are nestingly received within the annular recess 12 wherein they are identified by the numeral 15. Portions 15 extend circumferentially about the confining flange 2, and extension rings 9 (secured thereto as by solder) for substantially one convolution, at which point 16 end portions of conduit 13 cross back over the side edges 7 of the reinforcing jacket 6 and terminate in enlarged inlet and outlet terminals 17 and 18 on the outer peripheral surface of said jacket 6.

Having disclosed a preferred embodiment of my invention, as provided by sec. 488 of the statutes, I wish to be specifically understood that same is capable of modification without departure from the scope of the invention as defined by the appended claims.

What I claim is:

1. In a device of the class described, a cylinder-like matrix formed from sheet metal and having laterally-spaced radially inwardly projecting endless V-shaped tread material confining flanges adjacent its opposite side edges, and a tubular heating conduit wound generally spirally of said matrix and rigidly secured thereto, the opposite end portions of said conduit extending over the adjacent edges of said matrix at given points and contacting the outer side faces of said V-shaped confining flanges for substantially one convolution, the extreme outer end portions of said conduit crossing back over the side edges of said matrix and terminating on the outer peripheral surface thereof in enlarged inlet and outlet terminals respectively.

2. The structure defined in claim 1 in which said confining flanges are provided with extension elements in the form of metallic rings welded to the crown of the V and extending generally radially inwardly therefrom in substantially the same plane as the inner faces of said confining flanges, said extension elements and the outer faces of said confining flanges providing an endless cross-sectionally V-shaped nest for the reception of said heating conduit.

3. The structure defined in claim 1 in which said matrix is provided with an endless metallic reinforcing jacket which has its opposite side edges crimped over the opposite side edges of the matrix, whereby to positively hold said matrix against lateral expansion, and in which the convolutions of said heating conduit intermediate the side edges of said matrix and the inlet and outlet terminals are secured to said reinforcing jacket.

RAYMOND P. HAWKINSON.

References Cited in the file of this patent

UNITED STATES PATENTS

| Number | Name | Date |
|---|---|---|
| 1,548,215 | Semler | Aug. 4, 1925 |
| 2,331,679 | Hawkinson | Oct. 12, 1943 |